United States Patent
Vasantham et al.

(10) Patent No.: US 10,902,017 B2
(45) Date of Patent: *Jan. 26, 2021

(54) SYNCHRONIZING DATABASE DATA TO A DATABASE CACHE

(71) Applicant: Walmart Apollo, LLC, Bentonville, AR (US)

(72) Inventors: Madhavan Kandhadai Vasantham, Foster City, CA (US); Mahesh Tyagarajan, San Jose, CA (US); Sreekanth Sreedhararaj, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,913

(22) Filed: Oct. 29, 2018

(65) Prior Publication Data

US 2019/0065572 A1 Feb. 28, 2019

Related U.S. Application Data

(63) Continuation of application No. 14/230,956, filed on Mar. 31, 2014, now Pat. No. 10,114,880.

(51) Int. Cl.
*G06F 16/27* (2019.01)
*G06Q 10/08* (2012.01)
(Continued)

(52) U.S. Cl.
CPC ........ *G06F 16/27* (2019.01); *G06F 16/24552* (2019.01); *G06F 16/24565* (2019.01); *G06F 16/258* (2019.01); *G06Q 10/087* (2013.01)

(58) Field of Classification Search
CPC .. G06F 16/27; G06F 16/24552; G06F 16/258; G06F 16/24565; G06Q 10/087
(Continued)

(56) References Cited

U.S. PATENT DOCUMENTS 6,272,948 B1  8/2001  Klippert
6,728,948 B1 *  4/2004  Baxter ................. G06Q 10/087
                                                           705/26.1

(Continued)

OTHER PUBLICATIONS

Datta, Anindya; Dutta, Kaushik; Thomas, Helen; VanderMeer, Debra; World Wide Wiat: A Study of Internet Scalability and Cache-Based Approaches to Alleviate It, Management Science; Oct. 2003; 49, 10; ProQuest Central, p. 1425 Oct. 2003.

*Primary Examiner* — Hosain T Alam
*Assistant Examiner* — Nicholas E Allen
(74) *Attorney, Agent, or Firm* — Bryan Cave Leighton Paisner LLP

(57) ABSTRACT

A system to perform certain acts to indicate when an order state within an order database has been modified. The acts can include determining that an order lookup comprises an intent to cancel an order line item. The acts can also include running rules to determine whether the order line item is authorized to be cancelled by synchronizing the cancellation and pushing a cancel state asynchronously to the order database cache. When the order line item is not authorized to be cancelled, the acts can detect that the order state has not been modified. The acts can call to a caching interface to asynchronously push a not cancel state to the order state in the order database cache. The acts can publish the not cancel order state from the order database to the order database cache. The acts can display a message that the order state cannot be modified.

20 Claims, 5 Drawing Sheets

(51) Int. Cl.
*G06F 16/25* (2019.01)
*G06F 16/2455* (2019.01)

(58) Field of Classification Search
USPC .......................................................... 707/634
See application file for complete search history.

(56) References Cited

U.S. PATENT DOCUMENTS

| | | | | |
|---|---|---|---|---|
| 7,318,043 B1* | 1/2008 | Silver | .................... | G06Q 30/00 |
| | | | | 705/26.81 |
| 7,698,170 B1 | 4/2010 | Darr et al. | | |
| 8,495,487 B2* | 7/2013 | Jerome | ................. | G06Q 40/00 |
| | | | | 707/602 |
| 8,615,439 B2* | 12/2013 | Ramaratnam | .......... | G06Q 20/20 |
| | | | | 705/21 |
| 9,489,425 B2 | 11/2016 | Vasantham et al. | | |
| 10,068,281 B2 | 9/2018 | Vasantham et al. | | |
| 2002/0007321 A1* | 1/2002 | Burton | ................. | G06Q 10/087 |
| | | | | 705/51 |
| 2002/0055878 A1* | 5/2002 | Burton | ................... | G06Q 30/06 |
| | | | | 705/27.2 |
| 2002/0143655 A1* | 10/2002 | Elston | ................. | G06Q 20/023 |
| | | | | 705/26.81 |
| 2003/0018513 A1* | 1/2003 | Hoffman | ................ | G06Q 10/06 |
| | | | | 705/7.32 |
| 2004/0015386 A1* | 1/2004 | Abe | ................ | G06Q 10/06375 |
| | | | | 705/7.29 |
| 2004/0019494 A1* | 1/2004 | Ridgeway | .......... | G06Q 10/0637 |
| | | | | 705/26.1 |
| 2005/0050067 A1 | 3/2005 | Sollicito et al. | | |
| 2006/0011720 A1* | 1/2006 | Call | ........................ | A61L 2/10 |
| | | | | 235/383 |
| 2006/0085250 A1* | 4/2006 | Kantarjiev | ............ | G06Q 10/08 |
| | | | | 705/28 |
| 2006/0212361 A1* | 9/2006 | Perkowski | ............ | G06Q 30/02 |
| | | | | 705/26.62 |
| 2006/0250248 A1* | 11/2006 | Tu | .......................... | G06Q 10/06 |
| | | | | 340/572.4 |
| 2007/0233580 A1* | 10/2007 | Pike | .................. | G06Q 30/0603 |
| | | | | 705/27.1 |
| 2007/0260591 A1* | 11/2007 | Ahi | ...................... | G06Q 10/109 |
| 2008/0294996 A1* | 11/2008 | Hunt | ....................... | G06Q 30/02 |
| | | | | 715/739 |
| 2009/0019003 A1* | 1/2009 | Bohannon | ............. | G06Q 30/02 |
| 2009/0026255 A1 | 1/2009 | Besecker | | |
| 2009/0031232 A1* | 1/2009 | Brezina | .................. | G06F 16/248 |
| | | | | 715/764 |
| 2009/0198536 A1* | 8/2009 | Hamilton, II | ...... | G06Q 30/0239 |
| | | | | 705/37 |
| 2009/0254337 A1* | 10/2009 | Sprecher | ............... | G06F 16/951 |
| | | | | 704/9 |
| 2009/0276449 A1* | 11/2009 | Syed | .................... | G06F 16/2453 |
| 2011/0218842 A1* | 9/2011 | Addala | ........... | G06Q 10/06393 |
| | | | | 705/7.39 |
| 2011/0258079 A1* | 10/2011 | Ngan | ..................... | G06Q 20/12 |
| | | | | 705/26.44 |
| 2012/0084178 A1* | 4/2012 | Ehbauer | ............. | G06Q 30/0613 |
| | | | | 705/26.41 |
| 2012/0089700 A1* | 4/2012 | Safruti | ................ | H04L 67/2842 |
| | | | | 709/217 |
| 2012/0095874 A1* | 4/2012 | Bruno | ................... | G06Q 30/06 |
| | | | | 705/26.41 |
| 2012/0143666 A1* | 6/2012 | Carrion | .................. | G06Q 30/02 |
| | | | | 705/14.22 |
| 2012/0226595 A1* | 9/2012 | Torres | ..................... | G06Q 40/06 |
| | | | | 705/37 |
| 2012/0226612 A1* | 9/2012 | Kurtis | .................... | G06Q 40/00 |
| | | | | 705/44 |
| 2012/0265671 A1* | 10/2012 | Higgins | ................ | G06F 21/335 |
| | | | | 705/39 |
| 2012/0278242 A1* | 11/2012 | Griffith | ............. | H04W 12/0013 |
| | | | | 705/304 |
| 2013/0085984 A1* | 4/2013 | Burger | .............. | G06F 16/24547 |
| | | | | 707/609 |
| 2013/0151381 A1* | 6/2013 | Klein | .................. | G06Q 30/0641 |
| | | | | 705/27.1 |
| 2013/0151491 A1* | 6/2013 | Gislason | ............. | G06F 16/2282 |
| | | | | 707/696 |
| 2013/0173402 A1* | 7/2013 | Young | ................ | G06Q 30/0635 |
| | | | | 705/14.73 |
| 2013/0204697 A1* | 8/2013 | Boal | .................. | G06Q 30/0207 |
| | | | | 705/14.51 |
| 2013/0211870 A1* | 8/2013 | Lawson | ........... | G06Q 10/06315 |
| | | | | 705/7.25 |
| 2013/0211967 A1* | 8/2013 | Ogilvy | .................... | G06Q 20/12 |
| | | | | 705/26.82 |
| 2013/0218589 A1* | 8/2013 | Lerner | ................ | G06F 19/3456 |
| | | | | 705/2 |
| 2013/0218716 A1* | 8/2013 | Godsey | ................... | G06Q 30/06 |
| | | | | 705/26.8 |
| 2013/0222116 A1* | 8/2013 | Barry, III | ............... | G06Q 50/22 |
| | | | | 340/10.1 |
| 2013/0282466 A1* | 10/2013 | Hampton | ........... | G06Q 30/0633 |
| | | | | 705/14.27 |
| 2013/0290234 A1* | 10/2013 | Harris | .................... | G06N 5/022 |
| | | | | 706/46 |
| 2013/0297458 A1* | 11/2013 | Van de Capelle | ......................... G06Q 30/0635 |
| | | | | 705/26.81 |
| 2013/0311315 A1* | 11/2013 | Zises | .................. | G06Q 30/0605 |
| | | | | 705/26.2 |
| 2013/0318152 A1* | 11/2013 | Iyer | ........................ | G06F 9/541 |
| | | | | 709/203 |
| 2013/0332488 A1* | 12/2013 | Christy | .................. | G06Q 30/01 |
| | | | | 707/781 |
| 2013/0346380 A1* | 12/2013 | Dong | ..................... | G06F 16/23 |
| | | | | 707/705 |
| 2014/0025535 A1* | 1/2014 | Douglas | ........... | G06Q 30/0633 |
| | | | | 705/26.8 |
| 2014/0052750 A1* | 2/2014 | Ciabrini | ............ | G06F 16/24552 |
| | | | | 707/769 |
| 2015/0278321 A1 | 10/2015 | Vasantham et al. | | |
| 2015/0278923 A1 | 10/2015 | Vasantham et al. | | |

* cited by examiner

SYNCHRONIZING DATABASE DATA TO A DATABASE CACHE

CROSS-REFERENCE TO RELATED APPLICATIONS

This application is a continuation of U.S. application Ser. No. 14/230,956, filed Mar. 31, 2014. U.S. application Ser. No. 14/230,956 is incorporated herein by reference in its entirety.

BACKGROUND

1. Field of the Invention

This invention relates generally to the field of synchronizing data, and, more particularly, to methods, systems, and computer program products for synchronizing data from a database to a database cache.

2. Related Art

Retailers often maintain an order database of customer orders. When a customer orders or purchases one or more products, a corresponding order record can be created and stored in the order database. Customer orders can include various different types of order data, such as, for example, an order number, date/time of order, list of items purchased, cost of items purchased, quantity of items purchases, shipping method, a customer number, order status (e.g., pending, processed, shipped, etc.). Looking up their current and past orders is very important to customers. Thus, retailers typically allow customer access to an order database so that customers can view information about their orders. For example, through a website or mobile application a customer can query an order database for information about their orders. The order database can receive a query, identify one or more orders satisfying the query, and return the identified one or more orders to the client.

For some retailers, customer order database queries place a significant burden on order database resources. The resources consumed responding to customer queries can result in slower response to times for all customers. Slower response times can having a negative impact on the buying experience and, if response times are to slow, may cause a retailer to lose customers. That is, if response times are to slow, a prospective customer may be become impatient and/or frustrated and look for items elsewhere.

When buying online (e.g., through electronic commerce, mobile commerce, and social commerce environments), customers typical interact with a retailer through a graphical user interface (e.g., a website). The graphical user interface (can sit on top of, for example, a product database and) allows customers to browse and order items. When an order process is complete, a retailer can provide an order link for an order to the customer. The order link can then be selected to access order data corresponding to the order.

Thus, upon completion of an order, some customers may immediately and repeatedly start selecting the order link (e.g., clicking with a mouse) until order data is returned. Each time the order link is selected, a new query can be issued to the database for corresponding order data. The frequency of selecting the link may be much faster than the order database can respond. As such, multiple redundant queries can be issued for the same order data. The order database processes the redundant queries and returns multiple copies of the order data. Since many of the queries are redundant, order database resources are unnecessarily consumed.

Redundant queries can further deplete available order database resources, making it even more difficult to provide reasonable response times to all customers.

BRIEF DESCRIPTION OF THE DRAWINGS

The specific features, aspects and advantages of the present invention will become better understood with regard to the following description and accompanying drawings where.

DETAILED DESCRIPTION

Figure 1:
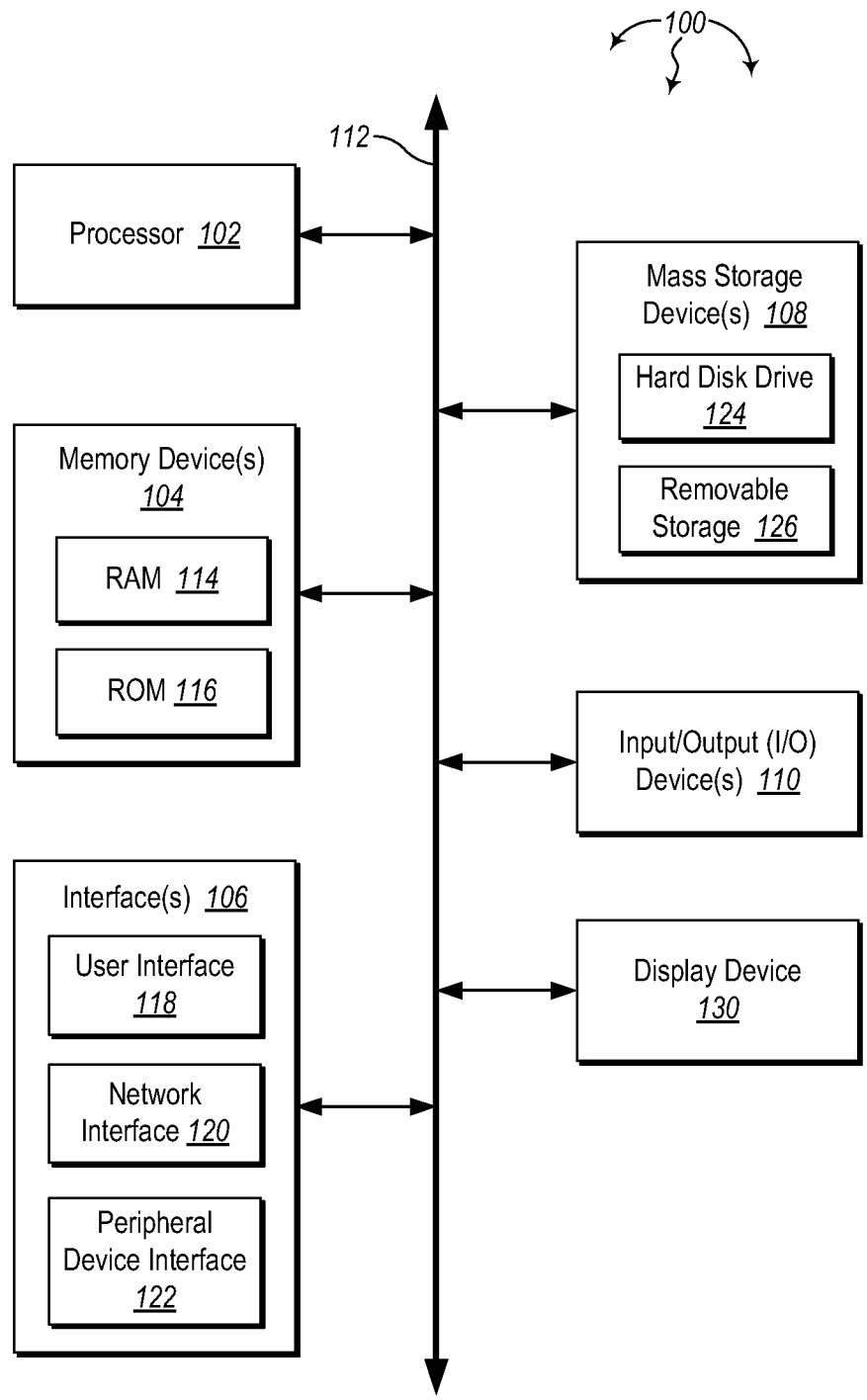
FIG. 1 illustrates an example block diagram of a computing device.

The present invention extends to methods, systems, and computer program products for synchronizing database data to a database cache. In some embodiments, order data from an order management system database is synchronized to an order cache.

In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, kiosks, Point-Of-Sale ("POS") terminals, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

The present invention is generally directed to synchronizing database data to a database cache. Embodiments of the invention facilitate synchronizing order data from an order management system database to an order cache. When order data is synchronized, more efficient order lookups of the order data can occur. The order cache can store order objects in and attribute-value pair (e.g., a JavaScript Object Notation ("JSON") format.

In some embodiments, the order management system database feeds the order cache with the latest updates as relevant state for orders is modified. A trigger within the order management system database can indicate when order state is modified. The trigger is monitored. When the trigger indicates modified order state, a caching interface (e.g., a caching API) can be called to publish the modified order state to the order cache.

When an order lookup is received, a business layer determines if the cache can appropriately service the order lookup. If so, the business layer routes the order lookup to the cache. Otherwise, the business layer routes the order lookup to the order management system database. In some embodiments, order lookups configured to impact state of the order management system database (e.g., that write or change order data) are routed to the order management system database. In these same embodiments, order lookups configured to not impact state of the order management system database (e.g., that read order data) are routed to the cache.

Many different types of order lookups do not impact state. Routing these types of order lookups to the order cache reduces resource consumption at the order management system database. In turn, resources are freed up so that order lookups having a state impact can be more efficiently serviced at the order management system database. Routing order lookups that do not impact state to the cache (as opposed to the order management system database) also facilitates more efficient servicing of these order lookups.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
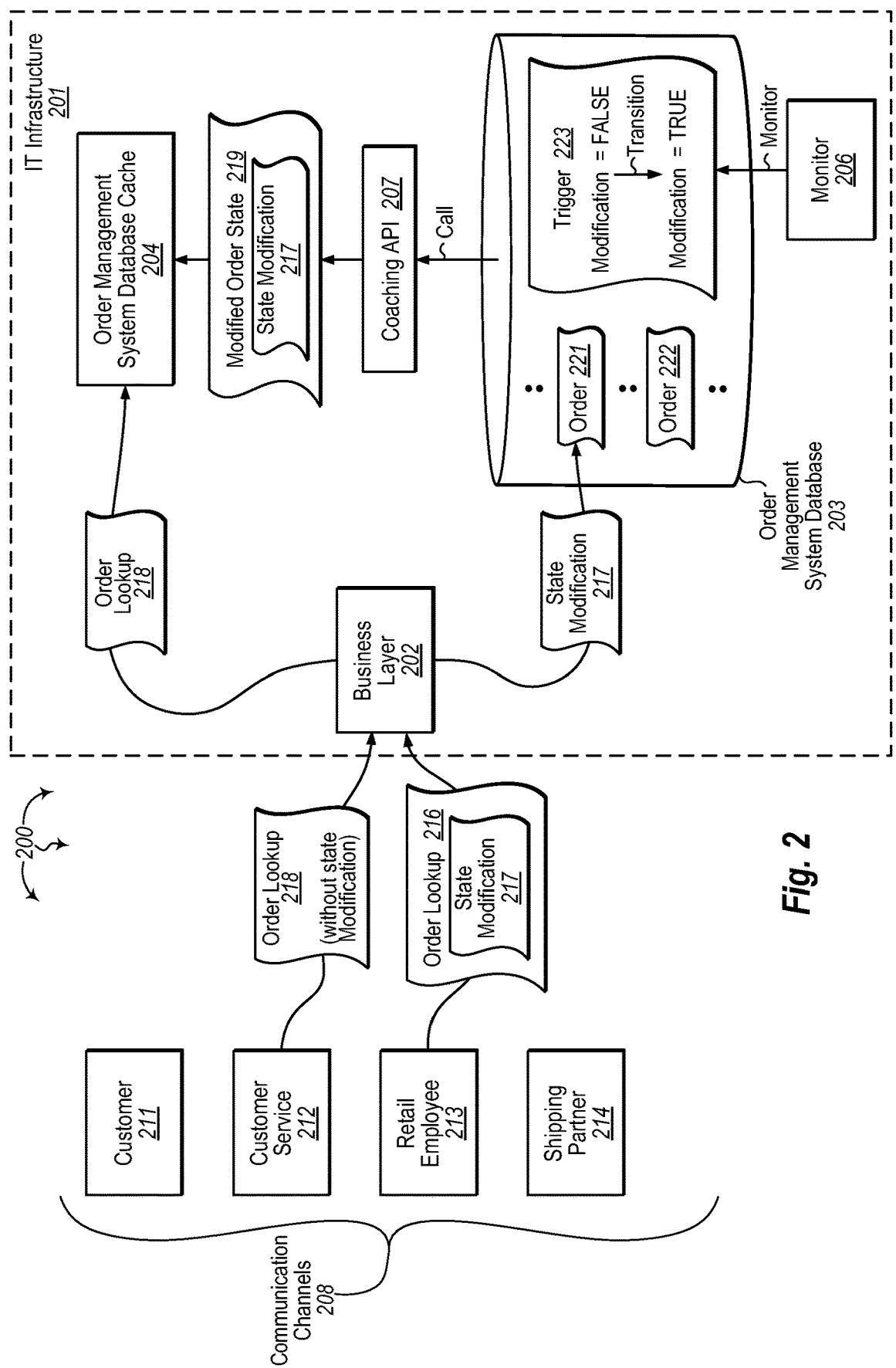
FIG. 2 illustrates an example computer architecture that facilitates synchronizing database data to a database cache.

FIG. 2 illustrates an example computer architecture that facilitates synchronizing database data to a database cache. As depicted, computer architecture 200 includes Information Technology ("IT") infrastructure 201 and communication channels 208. IT infrastructure 201 and communication channels 208 can be connected to (or be part of) a network, such as, for example, a PAN, a LAN, a WAN, and even the Internet. IT infrastructure 201 and communication channels 208 can be connected to a variety of other systems over the network. Accordingly, IT infrastructure 201 and communication channels 208, as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

IT infrastructure 201 can be associated with (and potentially owned by) a retail business entity. As such, IT infrastructure 201 can be connected to or include a Point-Of-Sale ("POS") system for the retail business entity. IT infrastructure 201 can also be connected to or include one or more of electronic commerce (e-commerce), mobile commerce (m-commerce), and social commerce modules for the retail business entity. Using a POS system or commerce module, a customer can perform a variety of retail related operations, including purchase items, order items, return items, track orders, track items, access order details, update order details, etc.

As depicted, IT infrastructure 201 further includes business layer 202, order management system database 203, order management system database cache 204, monitor 206, and caching API 207. Order management system ("OMS") database 203 can store order details for customer orders, such as, for example, orders 221, 222, etc. From time to time, at specified intervals, or in response to designated triggers, OMS database 203 can synchronize order data to OMS database cache 204. For example, monitor 206 can monitor a trigger within order management system database 203. When the trigger indicates that order state has been modified, caching API can be called to publish modified order state to order management system database cache 204.

As such, OMS database cache 204 can also store order details for customer orders. An order detail for an order can include, for example, one or more of: an order number, date/time of order, list of items purchased, cost of items purchased, quantity of items purchased, shipping method, tracking number, customer number, and order status. Order status can be, for example, order created, order in process, order being fulfilling, order shipped, order delivered, order return created, order return received and order return processed.

OMS database 203 and OMS database cache 204 can store order details in different formats. For example, OMS database 203 can store order details in a relational database management system ("RDBMS") format and OMS database cache 204 can store order details in other formats based on attribute-value pairs. These other formats include JavaScript Object Notation ("JSON") and eXstensible Markup Language ("XML"). Thus, synchronizing order details from OMS database 203 to OMS database cache 204 can include converting order details from an RDBMS format to a format based on attribute-value pairs. In some embodiments, caching API 207 converts between formats of OMS database 203 and OMS database cache 204. Use of attribute-value pair formats helps ensure that order lookups entered through a website or mobile application are efficiently serviced.

Business layer 202 is configured to route order lookups to an appropriate data source to service the order lookups. In some embodiments, business layer 202 can route order lookups that modify order state to OMS database 203 and can route order lookups that do not modify order state to OMS database cache 204. For example, an order lookup requesting a change to the quantity of a purchased item can be routed to OMS database 203. On the other hand, an order lookup requesting order numbers for all orders in the last three months can be routed to OMS database cache 204. Business layer 202 can also consider other characteristics, such as, for example, whether an order detail has yet been synchronized, time since order creation, etc., when routing order lookups.

Communication channels 208, including customer 211, customer service 212, retail employee 213, and shipping partner 214, can send order lookups to IT infrastructure 201. Communication channels 208 can send order lookups through any of a variety of different channels including a POS terminal, an in-store kiosk, e-commerce, m-commerce, social commerce, etc. Order lookups can be sent through communication channels 208 on the behalf of a customer (of the retail business entity). An order lookup can also be sent by a customer on their own behalf. For example, a customer can login to a website or mobile application of the retail business entity. The customer can then submit an order lookup through appropriate (e.g., graphical user) interfaces. Alternately, an employee or agent of the retail business entity, for example, in a physical store location or through customer service, can submit an order lookup on behalf of a customer. For example, an in store employee can submit an order lookup for a customer through a POS terminal.

An order lookup sent from a communication channel 208 may or may not request a change to the state of OMS database 203. As described, business layer 202 can receive an order lookup and route the order lookup to an appropriate data source to service the order lookup. Indicated order data responsive to an order lookup can be identified at and gathered from the appropriate data source. Subsequently, in response to the order lookup, IT infrastructure 201 can return the indicated order data. For example, if a customer requests a list of their orders having a purchase price over $100, IT infrastructure 201 can return a list of order numbers for orders having a purchase price over $100. If customer requests that an order be canceled, IT infrastructure 201 can return an indication that the order has been canceled.

Figure 3:
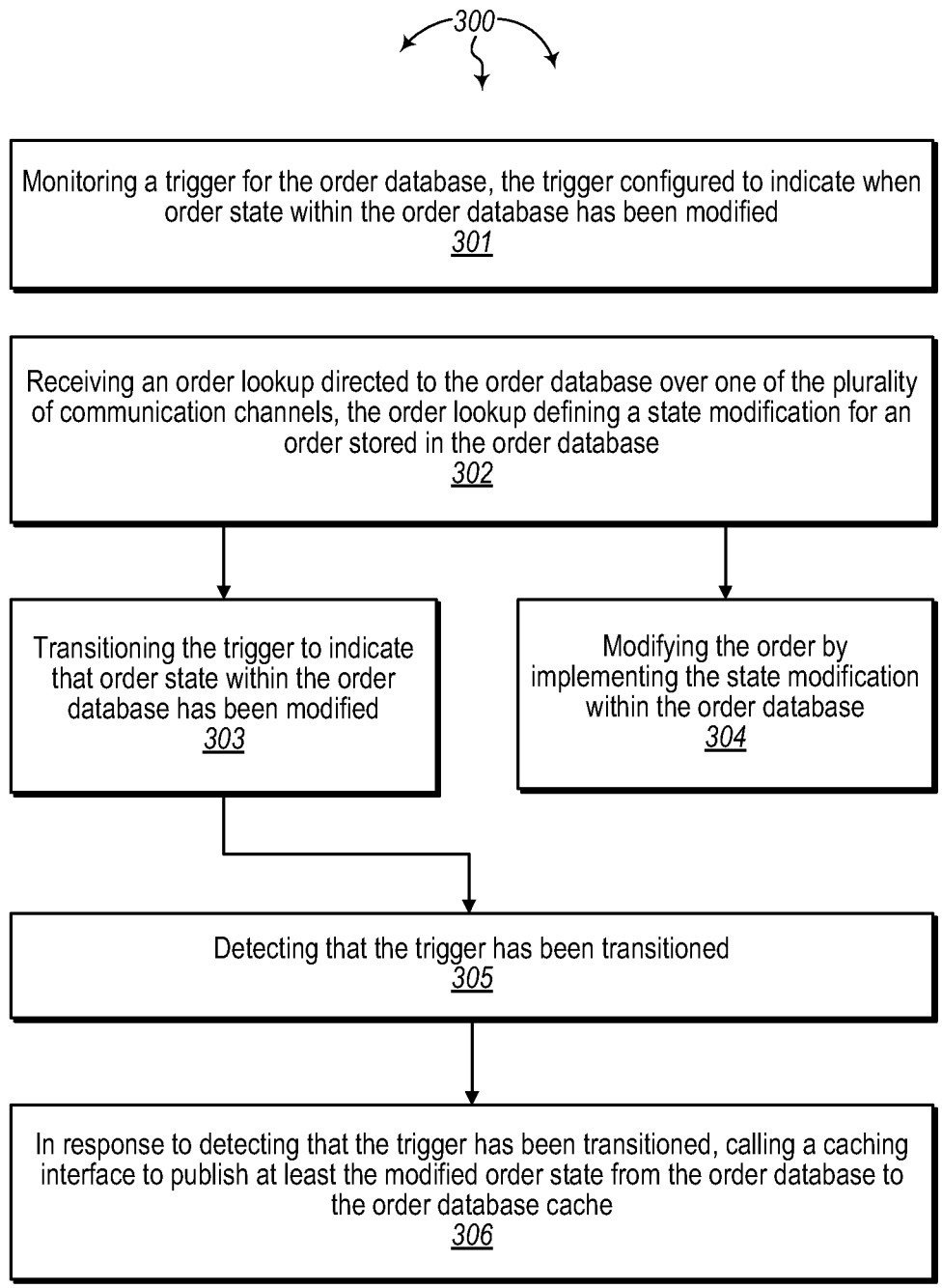
FIG. 3 illustrates a flow chart of an example method for synchronizing database data to a database cache.

FIG. 3 illustrates a flow chart of an example method 300 for synchronizing database data to a database cache. Method 300 will be described with respect to the components and data of computer architecture 200.

As described, order lookups that do not modify order state can be routed to OMS database cache 204. For example, customer service 212 can send order lookup 218 (without state modification) to IT infrastructure 201. Business layer 202 can receive order lookup 218 from customer service 212. Business layer 202 can determine that OMS database cache 204 is the appropriate data source to service order lookup 218. As such, business layer 202 can route order lookup 218 to OMS database cache 204. OMS database cache 204 can service order lookup 218 and return requested order data back to customer server 212.

Method 300 includes monitoring a trigger for the order database, the trigger configured to indicate when order state within the order database has been modified (301). For example, monitor 206 can monitor trigger 223 (e.g., a database trigger). Trigger 223 is configured to indicate when order state within OMS database 203 has been modified. When initially configured or after publishing order state modifications, trigger 223 can be set or transitioned to Modification=FALSE.

Retail employee 213 can send order lookup 216, including state modification 217, to IT infrastructure 201. State modification 217 can define a state modification for order 221.

Method 300 includes receiving an order lookup over one of the plurality of communication channels, the order lookup defining a state modification for an order stored in the order database (302). For example, business layer 202 can receive order lookup order lookup 216, including state modification 217, from the retail employee 213.

Business layer 202 can determine that OMS database 203 is the appropriate data source to service order lookup 216. As such, business layer 202 can route order lookup 216 to OMS database 203.

Method 300 includes modifying the order by implementing the state modification within the order database (303). For example, OMS database 203 can modify order 221 by implementing state modification 217 within OMS 203. OMS database 203 can return modified order data back to retail employee 213.

Method 300 includes transitioning the trigger to indicate that order state within the order database has been modified (304). For example, OMS database 203 can transition trigger 223 from Modification=FALSE to Modification=TRUE. Method 300 includes detecting that the trigger has been transitioned (305). For example, monitor 206 can detect that trigger 223 has transitioned from Modification=FALSE to Modification=TRUE.

In response to detecting that the trigger has been transitioned, calling a caching interface to publish at least the modified order state from the order database to the order database cache (306). For example, monitor 206 or OMS database 203 can call caching API 207. Caching API 207 can publish modified order state 219, including state modification 217, to OMS database cache 204. Caching API 207 can also convert between a data format of OMS database 203 (e.g., an RDBMS format) and a data format of OMS database cache 204 (e.g., JSON). Accordingly, OMS database cache 204 can be updated with state modifications to orders in OMS database 203.

Figure 4:
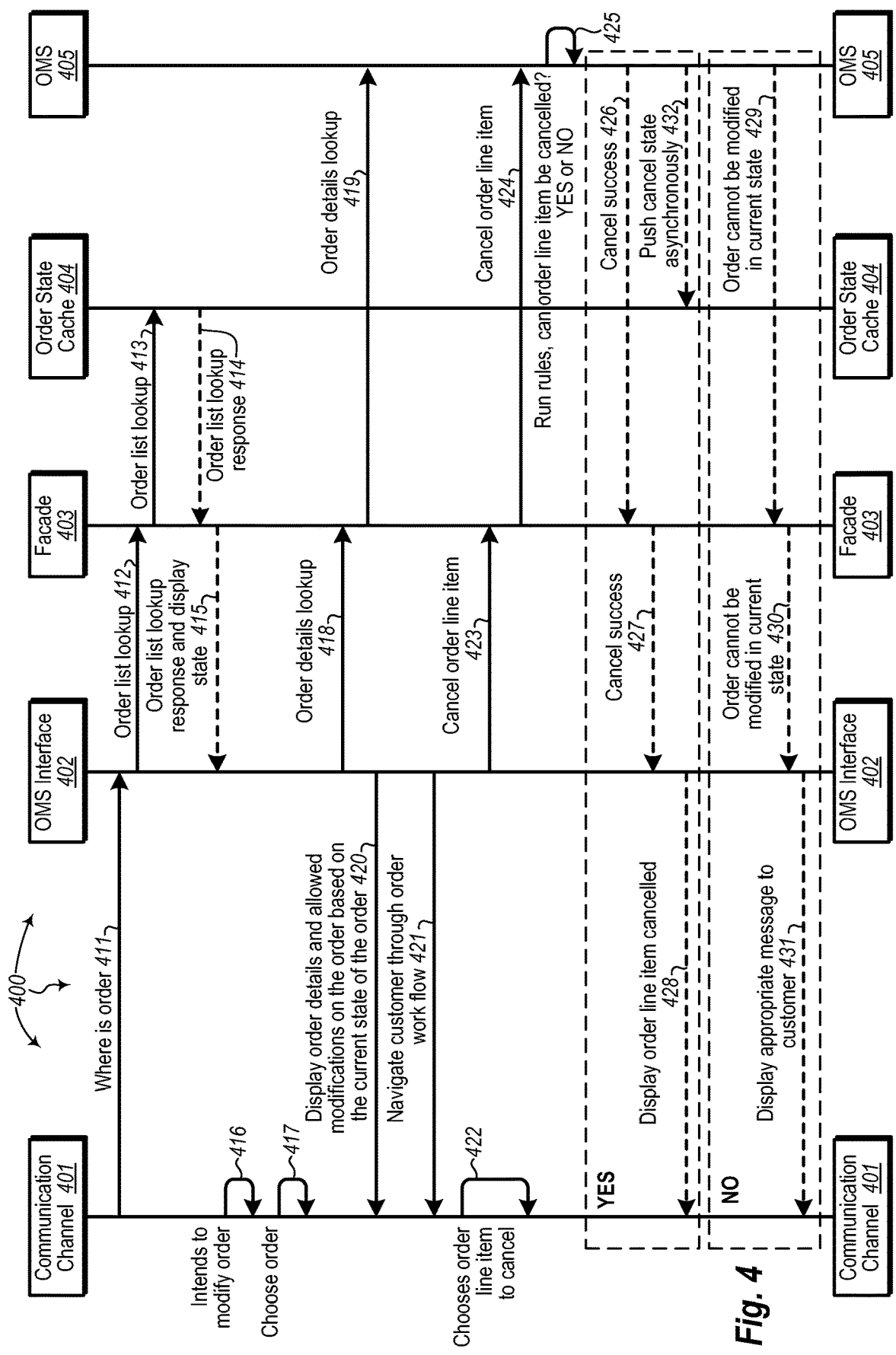
FIG. 4 illustrates a sequence diagram of an example for processing an order line item cancellation.

FIG. 4 illustrates a sequence diagram 400 of an example for processing an order line item cancellation. Communication channel 401 can log into OMS interface 402 via a communication channel, such as, for example, website, mobile, etc. Communication channel 401 can indicate a desire for order information (e.g., where is order request 411) through OMS interface 402. In response, OMS interface 402 can sent order list lookup 412 to facade 403 (which is similar to business layer 202). Facade 403 can determine that order list lookup 412 is not configured to impact state. Facade 403 can route corresponding order list lookup 413 to order state cache 404 (which is similar to OMS database cache 204). Thus, facade 403 acts as a proxy to route an order lookup request to order state cache 404 (as opposed to a corresponding OMS database).

Order state cache 404 can return order list lookup response 414 to facade 403. Order list lookup response 414 can include the order status of one of a customer's orders. In response, facade 403 can send corresponding order list lookup response 415 (also including the order status of the customer's order) to OMS interface 402. Communication channel 401 can indicate an intent to modify an order and choose the order (e.g., intends to modify order 416 and choose order 417).

In response, OMS interface 402 can send order details lookup 418 to facade 403. Since order details lookup 418 is associated with an intent to modify an order (and thus change state), facade 403 routes corresponding order details lookup 419 to OMS 405 (which is similar to OMS database 203). OMS interface 402 can display order details and allowed modifications on the order based on the current state of the order 420 to communication channel 401. OMS interface 402 can also navigate communication channel 401 through an order modification flow. Communication channel 401 can choose an order line item to cancel 422. In response, OMS interface 402 can send cancel order line item 423 to facade 403. Since cancel order line item 423 is associated with an intent to cancel a line item (and thus change state), facade 403 routes corresponding cancel order line item 424 to OMS 405.

OMS 405 runs rules to determine if the line item can be canceled 425. If rules indicate that the line item can be canceled, OMS 405 sends cancel success 426 to facade 403. Facade 403 in turn indicates can cancel success 427 to OMS interface 402. OMS interface 402 then displays the order line item as canceled 428 at communication channel 401. When the order line item is successfully canceled, OMS 405 can also synchronize the order line item cancellation with order state cache 404. For example, OMS 405 can push cancel state 431 asynchronously to order state cache 404.

If rules indicate that the line item cannot be canceled, OMS 405 returns order cannot be modified in current state 429 to facade 403. In turn, facade 403 returns order cannot be modified in current state 430 to OMS interface 402. OMS interface 402 displays an appropriate message 431 at communication channel 401.

Figure 5:
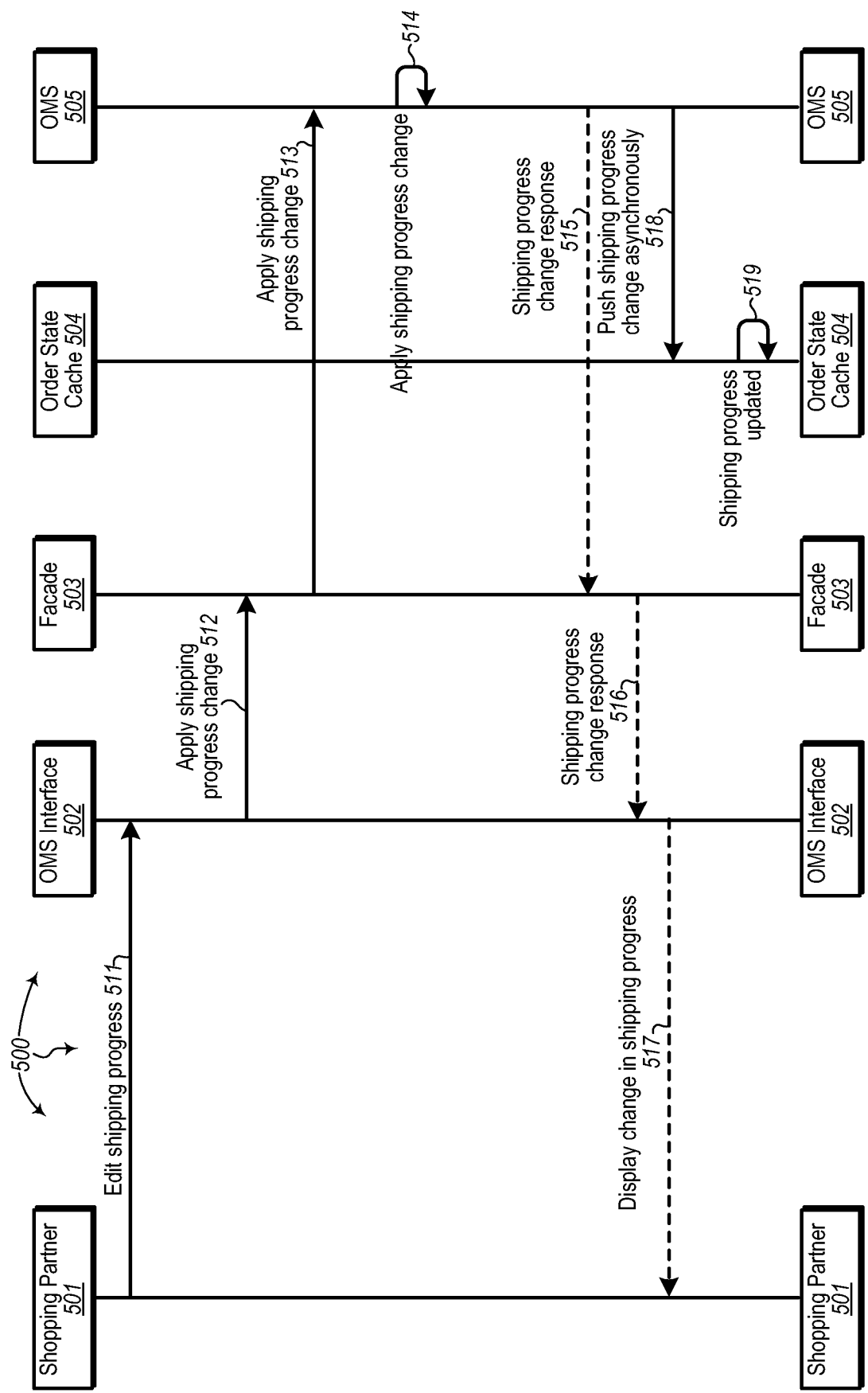
FIG. 5 illustrates a sequence diagram of an example for processing a shipping progress change.

FIG. 5 illustrates a sequence diagram of an example for processing a shipping address change. Shipper partner 501 can enter shipping progress 511 to OMS interface 502 (e.g., indicating that an order has reached a new intermediate destination in the delivery process). OMS interface 502 can send apply shipping progress change 512 to facade 503 (which is similar to business layer 202). Since apply shipping progress change 512 is associated with an intent to modify an order (and thus change state), facade 503 routes corresponding apply shipping progress change 513 to OMS 505 (which is similar to OMS database cache 204). OMS 505 implements rules 514 to determine if the shipping progress change can be applied.

If rules indicate that the shipping progress can be changed, OMS 505 applies the shipping progress change 515. OMS 505 sends shipping progress change success response 516 to facade 503. In turn, facade 503 sends shipping progress change 517 to OMS interface 502. OMS interface 502 can display the change in shipping progress to shipping partner 501 (e.g., indicate that the shipping change was appropriately entered at OMS 505). When shipping progress is successfully changed, OMS 505 can also synchronize the shipping progress change with order state cache 504. For example, OMS 505 can push shipping progress change 518 asynchronously to order state cache 504.

Other calls can also be made to recompute LOS, inventory, price, taxes, etc.

A number of embodiments can include a system including one or more processors and one or more non-transitory computer-readable media storing computing instructions configured to run on the one more processors and perform certain acts. The acts can include monitoring a trigger for an order database. The trigger can be configured to indicate when an order state within the order database has been modified. The acts can also include receiving an order lookup over one of one or more communication channels. The one or more communication channels can be in data communication with the order database. The acts can further include determining that the order lookup comprises an intent to cancel an order line item of an order stored in the order database. The acts can additionally include running rules to determine whether the order line item is authorized to be cancelled. Responsive to determining that the order line item is authorized to be cancelled, the acts can further include synchronizing the cancellation of the order line item with an order database cache by pushing a cancel state asynchronously to the order database cache. Additionally, responsive to determining that the order line item is not authorized to be cancelled, the acts can also include using the order database to perform certain acts. The order database can perform certain acts to detect that the trigger indicates that the order state has not been modified. Responsive to detecting that the trigger indicates that the order state has not been modified, the acts using the order database can further include a call to a caching interface to asynchronously push a not cancel state to the order state in the order database cache. When the order state comprises the not cancel state, the acts using the order database can publish the order state from the order database to the order database cache. Further, when the order database cache indicates the not cancel state, the acts using the order database can include a display a message that the order state cannot be modified.

Various embodiments can include a method being implemented via execution of computing instructions configured to run at one or more processors and stored at one or more non-transitory computer-readable media. The method can include monitoring a trigger for an order database. The trigger can be configured to indicate when an order state within the order database has been modified. The method can also include receiving an order lookup over one of one or more communication channels. The one or more communication channels can be in data communication with the order database. Further the method can include determining that the order lookup comprises an intent to cancel an order line item of an order stored in the order database. Additionally, the method can include running rules to determine whether the order line item is authorized to be cancelled. Responsive to determining that the order line item is authorized to be cancelled, the method can include synchronizing the cancellation of the order line item with the order database cache by pushing a cancel state asynchronously to an order database cache. Additionally, responsive to determining that the order line item is not authorized to be cancelled, the method can use the order database to detect that the trigger indicates that the order state has not been modified. Responsive to detecting that the trigger indicates that the order state has not been modified, the method can use the order database to call a caching interface to asynchronously push a not cancel state to the order state in the order database cache. When the order state comprises the not cancel state, the method can use an order database to publish the order state from the order database to the order database cache. When the order database cache indicates the not cancel state, the method can further use the order database to display a message that the order state cannot be modified.

Additional embodiments can include one or more non-transitory computer-readable media including instructions that when executed on one or more processors perform certain acts. The acts can include monitoring a trigger for an order database. The trigger can be configured to indicate when an order state within the order database has been modified. The acts can also include receiving an order lookup over one of one or more communication channels. The one or more communication channels can be in data communication with the order database. The acts can further include determining that the order lookup comprises an intent to cancel an order line item of an order stored in the order database. The acts can additionally include running rules to determine whether the order line item is authorized to be cancelled. Responsive to determining that the order line item is authorized to be cancelled, the acts can further include synchronizing the cancellation of the order line item with an order database cache by pushing a cancel state asynchronously to the order database cache. Additionally, responsive to determining that the order line item is not authorized to be cancelled, the acts can also include using the order database to perform certain acts. The order database can perform certain acts to detect that the trigger indicates that the order state has not been modified. Responsive to detecting that the trigger indicates that the order state has not been modified, the acts using the order database can further include a call to a caching interface to asynchronously push a not cancel state to the order state in the order database cache. When the order state comprises the not cancel state, the acts using the order database can publish the order state from the order database to the order database cache. Further, when the order database cache indicates the not cancel state, the acts using the order database can include a display a message that the order state cannot be modified.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed is:

1. A system comprising:
   one or more processors; and
   one or more non-transitory computer-readable media storing computing instructions configured to run on the one or more processors and perform:
      monitoring a trigger for an order database, the trigger configured to indicate when an order state within the order database has been modified;
      receiving an order lookup over a communication channel, the communication channel being in data communication with the order database;
      determining that the order lookup comprises an intent to cancel an order line item of an order stored in the order database;
      running rules to determine whether the order line item is authorized to be cancelled;
      responsive to determining that the order line item is not authorized to be cancelled, using the order database to:
         save the order state as a not cancel state in the order database;
         transition the trigger to indicate that the order state cannot be modified within the order database; and
         responsive to detecting that the trigger has not been further transitioned, publish the order state from the order database to an order database cache by calling a caching interface to asynchronously push the not cancel state from the order database to the order state in the order database cache; and
      when the order database cache indicates the not cancel state, display a message that the order state cannot be modified.

2. The system of claim 1, wherein:
   responsive to determining that the order line item is authorized to be cancelled, synchronizing cancellation of the order line item with the order database cache by pushing a cancel state asynchronously to the order database cache.

3. The system of claim 1, wherein the computing instructions are further configured to perform:
   responsive to determining that the order line item is authorized to be cancelled, synchronizing cancellation of the order line item with the order database cache by using the order database to:
      modify the order state by implementing a state modification within the order database;
      transition the trigger to indicate that the order state within the order database has been modified;
      detect that the trigger has been transitioned to indicate that the order state within the order database has been modified;
      when the order state within the order database comprises a cancel state, publish at least the order state from the order database to the order database cache after the order state is modified; and
      when the order database cache indicates the cancel state, display a message that the order state has been modified.

4. The system of claim 3, wherein:
   the synchronizing the cancellation of the order line item with the order database cache further comprises calling the caching interface to asynchronously push the cancel state to the order database cache.

5. The system of claim 4, wherein:
   the calling the caching interface to asynchronously push the cancel state to the order database cache further comprises calling a caching API to asynchronously push the cancel state to the order database cache.

6. The system of claim 5, wherein the caching interface further comprises the caching API publishing the order state from the order database to the order database cache after the order state in the order database is modified.

7. The system of claim 6, wherein:
   the caching API publishing the order state from the order database to the order database cache further comprises:
      accessing relational database management system ("RDBMS") formatted data from the order database;
      converting the relational database management system ("RDBMS") formatted data to corresponding JavaScript Object Notation ("JSON") formatted data; and
      sending the JavaScript Object Notation ("JSON") formatted data to the order database cache.

8. The system of claim 1, wherein the trigger for the order database further comprises:
   a setting for the trigger to be initially set to indicate no modification or a false setting.

9. The system of claim 1, wherein receiving the order lookup over the communication channel further comprises receiving the order lookup from:
 a customer;
 a retail employee;
 a customer service representative;
 a POS terminal;
 an in-store kiosk;
 an electronic commerce channel;
 a mobile commerce channel; or
 a social commerce channel.

10. The system of claim 1, wherein the computing instructions are further configured to perform:
 determining when to route the order lookup to the order database cache based at least in part on determining that the order lookup defines a state modification for the order state stored in the order database.

11. A method being implemented via execution of computing instructions configured to run at one or more processors and stored at one or more non-transitory computer-readable media, the method comprising:
 monitoring a trigger for an order database, the trigger configured to indicate when an order state within the order database has been modified;
 receiving an order lookup over a communication channel, the communication channel being in data communication with the order database;
 determining that the order lookup comprises an intent to cancel an order line item of an order stored in the order database;
 running rules to determine whether the order line item is authorized to be cancelled;
 responsive to determining that the order line item is not authorized to be cancelled, using the order database to:
  save the order state as a not cancel state in the order database;
  transition the trigger to indicate that the order state cannot be modified within the order database; and
  responsive to detecting that the trigger has not been further transitioned, publish the order state from the order database to an order database cache by calling a caching interface to asynchronously push the not cancel state from the order database to the order state in the order database cache; and
 when the order database cache indicates the not cancel state, display a message that the order state cannot be modified.

12. The method of claim 11, wherein:
 responsive to determining that the order line item is authorized to be cancelled, synchronizing cancellation of the order line item with the order database cache by pushing a cancel state asynchronously to the order database cache.

13. The method of claim 11, further comprising:
 responsive to determining that the order line item is authorized to be cancelled, synchronizing cancellation of the order line item with the order database cache using the order database by:
  modifying the order state by implementing a state modification within the order database;
  transitioning the trigger to indicate that the order state within the order database has been modified;
  detecting that the trigger has been transitioned to indicate that the order state within the order database has been modified;
  when the order state within the order database comprises a cancel state, publishing at least the order state from the order database to the order database cache after the order state is modified; and
  when the order database cache indicates the cancel state, displaying a message that the order state has been modified.

14. The method of claim 13, wherein:
 the synchronizing the cancellation of the order line item with the order database cache further comprises calling the caching interface to asynchronously push the cancel state to the order database cache.

15. The method of claim 14, wherein:
 the calling the caching interface to asynchronously push the cancel state to the order database cache further comprises calling a caching API to asynchronously push the cancel state to the order database cache.

16. The method of claim 15, wherein the caching interface further comprises the caching API publishing the order state from the order database to the order database cache after the order state in the order database is modified.

17. The method of claim 16, wherein:
 the caching API publishing the order state from the order database to the order database cache further comprises:
  accessing relational database management system ("RDBMS") formatted data from the order database;
  converting the relational database management system ("RDBMS") formatted data to corresponding JavaScript Object Notation ("JSON") formatted data; and
  sending the JavaScript Object Notation ("JSON") formatted data to the order database cache.

18. The method of claim 11, wherein the trigger for the order database further comprises:
 a setting for the trigger to be initially set to indicate no modification or a false setting.

19. The method of claim 11, wherein receiving the order lookup over the communication channel further comprises receiving the order lookup from:
 a customer;
 a retail employee;
 a customer service representative;
 a POS terminal;
 an in-store kiosk;
 an electronic commerce channel;
 a mobile commerce channel; or
 a social commerce channel.

20. The method of claim 11, further comprises:
 determining when to route the order lookup to the order database cache based at least in part on determining that the order lookup defines a state modification for the order state stored in the order database.

* * * * *